United States Patent [19]

Dykstra

[11] 4,050,752

[45] Sept. 27, 1977

[54] MODULAR LABORATORY CABINETS ADJUSTABLE IN ELEVATION

[75] Inventor: Donald P. Dykstra, Des Plaines, Ill.

[73] Assignee: Portable Laboratories, Inc., Elk Grove Village, Ill.

[21] Appl. No.: 676,151

[22] Filed: Apr. 12, 1976

[51] Int. Cl.² .......... A47B 9/00; F16L 3/22

[52] U.S. Cl. .......... 312/243; 312/195; 248/68 R; 108/147

[58] Field of Search .......... 312/243, 242, 195, 196, 312/239, 306, 268, 91; 214/1 D; 248/68; 108/147

[56] References Cited

U.S. PATENT DOCUMENTS

| | | | |
|---|---|---|---|
| 491,249 | 2/1893 | Reynolds | 312/196 |
| 2,512,108 | 6/1950 | Liptay | 248/68 R |
| 2,685,487 | 8/1954 | Woller | 108/147 X |
| 2,795,473 | 6/1957 | Smith | 108/147 |
| 2,931,685 | 4/1960 | Butler | 312/196 |
| 3,104,138 | 9/1963 | Renaud | 312/195 |
| 3,273,517 | 9/1966 | Amthor, Jr. et al. | 108/147 |
| 3,700,132 | 10/1972 | Waters | 214/1 D |
| 3,702,209 | 11/1972 | Moore | 312/196 |
| 3,765,036 | 10/1973 | Dykstra | 248/68 R |
| 3,917,076 | 11/1975 | Campbell | 214/1 D |

*Primary Examiner*—Paul R. Gilliam
*Assistant Examiner*—Victor N. Sakran
*Attorney, Agent, or Firm*—Darbo, Robertson & Vandenburgh

[57] ABSTRACT

A fixed utility cabinet houses various utility conduits, e.g., electricity, gas, water, etc. The upper part of the front of this utility cabinet is a solid panel while the lower part has openings closed by access doors. Immediately to the front of the utility cabinet is a table top secured to vertically telescopic supports. The supports rest on feet extending under the table top. The table top can be moved up and down substantially within the range defined by the solid front of the utility cabinet. Various forms of storage cabinets can be hung below the table top and spaced above the floor, with these storage cabinets moving vertically in unison with the table top. A wheeled cart having a hydraulic lift is used to facilitate securing the cabinets below the table top and for raising and lowering the table top.

6 Claims, 5 Drawing Figures

Fig. 5.
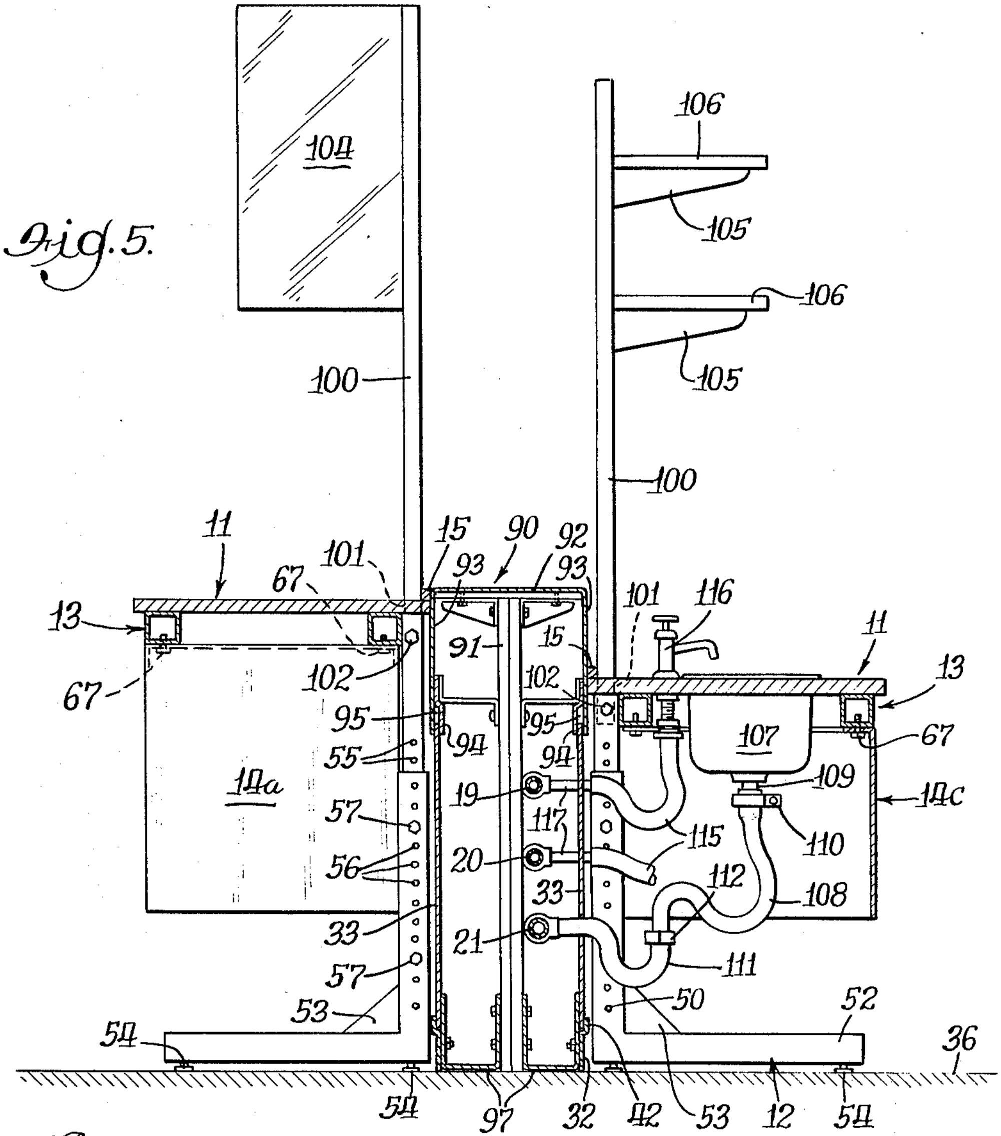
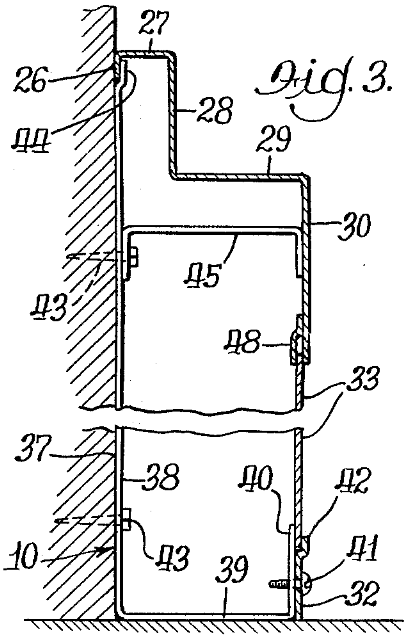
Fig. 3.
Fig. 4.
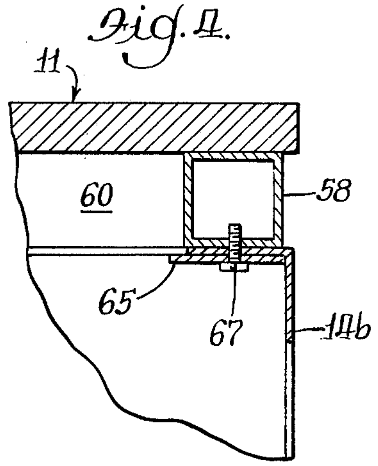

MODULAR LABORATORY CABINETS ADJUSTABLE IN ELEVATION

BACKGROUND AND SUMMARY OF THE INVENTION

My previous U.S. Pat. No. 3,765,036 relates to modular utility cabinets. Various types of establishments, such as research laboratories, hospitals, shops, etc., have a need for utility supplies (gas, water, electricity, etc.) in addition to a work surface in the nature of a table top and perhaps storage space in the nature of cabinets, drawers, etc. While embodiments of the invention of that patent have been used substantially to meet the requirement of such establishments, there are some instances in which special constructions are needed in order to satisfy the requirements of particular establishments.

The principal object of the present invention is to provide a modular construction which is more universally adapted to meet different requirements than is the case with embodiments of the invention of the aforesaid patent. To this end, the table top or work surface is mounted separately from the utility cabinet and is vertically adjustable within a predetermined range. Thus the height of the work surface can be varied to meet different requirements. At the same time, the installed assemblage has the appearance and functionality of a tailor-made unit. An important factor in this respect is that the upper part of the utility cabinet is solid within the range of elevations of the table top. In addition, there are storage cabinets suspended underneath the table top and above the floor which move vertically corresponding to the movement or adjustment of the table top.

A cart having a hydraulic lift is employed both for assembling the supply cabinets under the table top after the latter has been installed at the establishment and for adjusting the elevation of the table top when that is required.

Further objects and advantages will become apparent from the following description taken in conjunction with the drawings.

DESCRIPTION OF THE DRAWINGS

FIG. 3 is an enlarged end view of the utility cabinet of the embodiment of FIG. 1;

FIG. 4 is an enlarged fragmentary sectional view illustrating the mounting of the supply cabinet; and FIG. 5 is an end view of an island-type embodiment.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Figure 1:
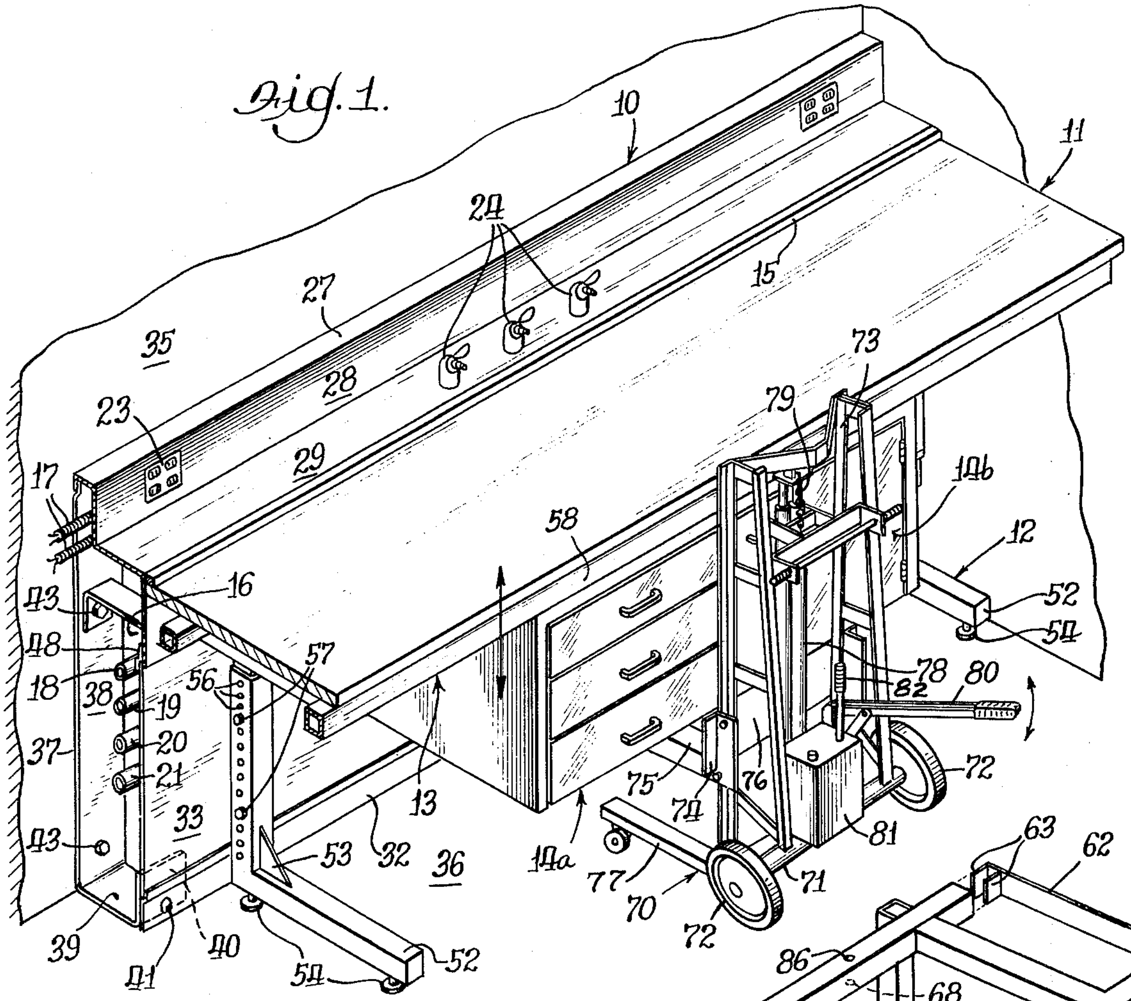
FIG. 1 is an isometric view of a wall-type embodiment of the invention.

FIG. 1 illustrates: a utility cabinet, generally 10, of a type to be mounted against a wall or the like; a table top or work surface, generally 11; vertically adjustable supporting means, generally 12; means, generally 13, for attaching the table top of the supporting means; and to two storage cabinets, generally **14*a* and 14*b*. The top has a back rail 15. It will be apparent that the storage cabinets can take various forms. Unit 14*a* has a plurality of drawers. Unit 14*b* has a single opening closed by a door and providing access to a storage space within which there may or may not be shelves. Cabinet 14*c*** is a sink cabinet and for the present purpose can be termed a storage cabinet. These various cabinets are merely illustrative.

The utility cabinet 10 defines a space 16 within which various utility conduits can be housed. For example, there may be electrical conduit 17, gas (e.g., air, oxygen, nitrogen, etc.) conduit 18, cold water conduit 19, hot water conduit 20 and waste conduit 21. These are suitably connected to utility outlets such as electrical outlet 23, gas or water outlets 24, etc. These various conduits and outlets are installed to meet the requirements of a particular establishment.

The wall mounted utility cabinet of FIG. 1 comprises an integral top defined by a back flange 26, an upper portion 27, an upright face 28, a shelf 29 and a front portion 30. Extending upwardly from the level of the floor there is a bottom front portion 32. Between the front portions 30 and 32 is an opening closed by a sliding door or panel 33 received in slots at the distal ends of the front portions 30 and 32.

Various arrangements may be employed to mount the utility cabinet at the front of a wall 35 and extending upwardly from the floor 36. In the illustrated embodiment a plurality of mounting plates 37 are employed at intervals along the length of wall 35. These plates comprise a back member 38, a floor member 39 and a front member 40. The bottom portion 32 of the cabinet is secured to front member 40 as by means of screws 41. The front member 40 and an offset 42 at the top of bottom front portion 32 define a slot for receiving door 33. Back member 38 is affixed to the wall 35 as by means of lag screws 43. The floor member 39 may be similarly affixed to floor 36. The top of the back member 38 has an offset 44 to define a space for receiving back flange 26 so that the flange is gripped between the offset and the wall. Supports 45 welded or otherwise affixed to a top front portion 30 are secured to the back member 38 as by means of one of lag screws 43.

A Z-plate 48 welded to the back of top front portion 30, along with that top front portion, defines a slot for holding the upper part of the door 33. This slot is elongated in the vertical dimension, as described in connection with the structure of FIG. 5, to enable the door to be inserted and removed.

The supporting means 12 includes outer and inner telescoping tubes 50 and 51 and a foot 52 welded to the bottom of the outer tube 50. The foot 52 extends below the top 11 throughout substantially the full front-to-back dimension of the top. A gusset 53 is welded between the outer tube 50 and the foot to hold them ridigly at right angles to each other. Extending downwardly from the foot are a pair of leveling supports 54. These are threaded into the foot so that they an be raised and lowered to compensate for uneveness in the floor. The supporting means 12 are spaced along the length of the table top and the number employed will depend upon that length. The inner and outer tubes have a plurality of transverse openings 55 and 56. These are used to receive bolts 57 to lock the tubes together at the desired elevation for the top 11.

The attachment means 13 includes a rectangular frame formed by front tube 58, rear tube 59 and cross tubes 60. The cross tubes 60 will be at locations corresponding to the locations of inner telescopic tubes 51. These tubes are rectangular in cross-section and are welded together. If manufactured to stock, the size, particularly the length, will depend upon the desires of the particular manufacturer as to what is most convenient; that is, either long multiple units which can be cut off to meet particular job requirements or smaller modules which are assembled together (as by means of bolts or telescopic connectors received in tubes 58, 59) in multiples to meet particular job requirements. The inner telescopic tube 51 is welded to the rear tube 59.

For appearance purposes, an end plate 62 is used to finish off the end of the frame. This plate has spring clips 63 which can be inserted into the ends of tubes 58 and 59 and frictionally engage the tubes to hold the end plate in place. If desired, these may be individual caps for each of the tubes rather than a common plate extending across the entire end.

The cabinets are formed with a metal frame. Across each of the top corners is a gusset 65 having an opening 66 therethrough. A threaded bolt 67 is inserted through each opening and screwed into one of tapped holes 68 in the bottom of the front and back tubes 58 and 59. These tapped holes are evenly spaced along all or particular parts of the underside of the tubes, for example they are on two inch centers. This permits the use of cabinets of different sizes as well as the positioning of cabinets at various locations along the length of the top.

FIG. 1 illustrates a wheeled cart, generally 70. It comprises a frame 71 having wheels 72 rotatably mounted thereon. The frame includes a pair of spaced rails 73. Each rail has a carriage 74 mounted thereon and slidably movable longitudinally of the rail. A pair of elongated platforms 75 extend outwardly from the carriages. The carriages and the platforms are secured to a cross plate 76. A hydraulic ram 78 has its cylinder attached to the frame and a chain 79 secured to the piston rod thereof. The chain is also attached to cross plate 76 so that as the piston rod moves outwardly of the cylinder the chain pulls up on the cross plate and platform 75. A hydraulic pump is operated by a handle 80. The hydraulic system includes a reservoir 81. A return valve is operated by a handle 82. With this valve closed, hydraulic fluid from the reservoir is forced into the ram 78 by a pumping motion of handle 80. This causes the piston rod to move out of the cylinder. When the platforms 75 are to be lowered, handle 82 is rotated to open the return valve and allow the hydraulic fluid to reenter reservoir 81. The frame includes a pair of extending feet 77 having casters at the distal ends thereof.

Figure 2:
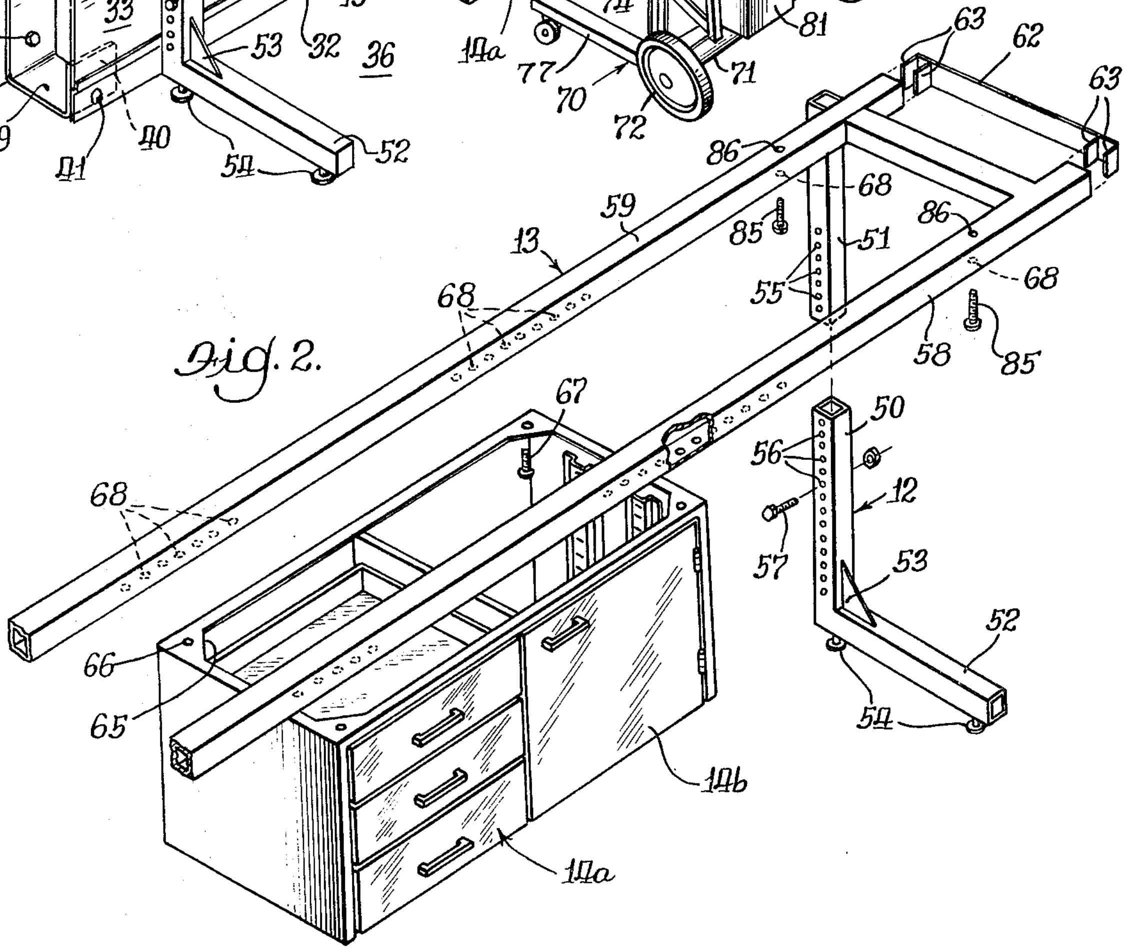
FIG. 2 is an exploded view of a portion of the embodiment of FIG. 1 showing the details thereon.

When the structure of FIG. 1 is to be installed, the utility cabinet 10 would first be mounted against the wall 35. With the doors 33 removed or open, the conduits 17–21 would be installed and connected, along with the outlets 23, 24. The components would then be brought into the room in individual pieces as illustrated in FIG. 2. The tubes 50, 51 would then be telescoped together and secured at what presumably would be the desired elevation for table top 11. Bolts 57 would be inserted through the openings 55, 56 to hold the tubes at that position with respect to each other. Either before or after the table top was put in place, the cabinets **14*a*, 14*b*, etc., would be secured to the mounting means 13. This would be done by placing the cabinets on platform 75 of the cart 70. With those platforms lowered, the cart 70 would be wheeled under the frame 58–60. Handle 80 would then be operated to move the cabinets up against the bottom of the rectangular frame at the desired location. Bolts 67 would then be inserted through opening 66 and threaded into tapped holes 68 to hold the cabinet in place. Platform 75 could then be lowered so that the cart 70** could be moved away.

Table top 11 is secured to the rectangular frame 58–60. This could be done in a variety of ways. For example, screws 85 could be inserted through the bottom openings 68 and in aligned top opening 86 and screwed into the underside of the top.

If it turned out that the table top 11 was not at the desired elevation, or if for some other reason the elevation was to be changed, the cart 70 would be inserted under one of the cabinets of about the center of gravity of the assemblage. Handle 80 would be operated to raise platform 75 snugly under the cabinet so that the cabinet and the table top were supported thereon. This would permit bolts 57 to be removed. With the bolts 57 removed, the assemblage would be raised or lowered as desired, as by means of a suitable manipulation of handles 80, 82. With the assemblage at the new elevation, bolts 57 would be replaced and the cart 70 withdrawn.

FIG. 5 illustrates the use of the invention in connection with an island-type utility cabinet, as distinguished from the wall-type utility cabinet of FIG. 1. Here the utility cabinet, generally 90, comprises an internal framework 91. A metal shell covers the upper part of the framework. The shell comprises a sheet metal (e.g., stainless steel) top 92 and integral top front portion 93. A Z-plate 94 along with the distal parts of the portions 93 define slots 95 to receive the tops of doors or cover plates 33. The bottom front portions 32 are secured to floor brackets 97 as by means of bolts. The floor brackets would be secured to the floor as desired. The floor brackets and offsets 42 define a bottom slot for receiving doors 33.

It will be noted that the top slot 95 extends vertically substantially above the top of the door 33. Thus the door may be lifted up to the top of the slot, whereupon the bottom of the door is above the top of the offset 42. In this position, the bottom of the door may be moved outwardly to clear offset 42 and then lowered to remove the door for access to the interior of the utility cabinet.

The FIG. 5 embodiment also includes a structure to provide overhead storage. Rectangular tubes 100 extend through openings 101 in table top 11 and telescopically into the interior of upper tubes 51. In the illustrated embodiment, they are secured to the upper tubes by bolts 102. With this arrangement, tubes 100 are raised or lowered with the raising or lowering of the upper tubes 51. Alternatively, the tubes 100 can extend below the bottom of upper tubes 51 and secured by the bolts 102 to the lower tubes 50. With that arrangement, the tubes 100 are not raised and lowered with the raising or lowering of the table top. Supporting means such as a storage cabinet 104 or shelf brackets 105 with shelves 106 may be suitably secured to tubes 100.

FIG. 4 also illustrates the manner in which a water supply and sink can be used in conjunction with the table top 11. The sink 107 is inserted into an opening in the table top in the usual manner of kitchen sinks. A hose 108 is secured to the tailpiece 109 of the sink drain as by means of a hose clamp 110. The other end of the hose is secured to a trap 111 as by means of a compression fitting 112 threaded onto the trap. Similarly, by the use of hoses of flexible tubes 115 the hot and cold water faucets 116 are connected to pipes 117 tee'd off from the supply conduits 19, 20.

I claim:

1. For use in a room having a floor, the combination of a utility cabinet for holding utility conduits, a table top and means for supporting the table top in front of said utility cabinet, wherein said means having an adjustment for permitting the table top to be set at a plurality of elevations within a selected range;

said utility cabinet having a front comprising an upper portion and a lower portion, said upper portion being solid throughout said range of elevations, said lower portion having an access opening to provide access to said utility conduits, and door means for said access opening.

2. The combination as set forth in claim 1, wherein said means includes a foot on said floor, below said top and extending throughout substantially the front-to-back dimension of said table top, a telescopic upright member at about the rear of said foot and secured to the foot, and means attaching said top to the upper part of the upright member.

3. The combination as set forth in claim 2, including a storage cabinet positioned below said top, spaced above the floor and secured to said attachment means, whereby said storage cabinet remains in the same relative position with respect to said table top regardless of the elevation of said table top.

4. The combination as set forth in claim 3, wherein said attachment means includes a frame immediately below said table top and comprising a front rail and a rear rail, and means to releasably affix said cabinet to said rails.

5. The combination as set forth in claim 3, including a wheeled cart for use in mounting said storage cabinet on said attachment means and for use in adjusting the elevation of said table top, said cart including a frame, a carriage movable vertically on said frame, said carriage including means in said space between the floor and the cabinet for contacting the bottom of the cabinet and supporting the cabinet which in turn will then support the attachment means and table top, and manually operable power means connecting said frame and supporting means to raise and lower the supporting means.

6. The combination as set forth in claim 2, including posts extending vertically above the table top, means connecting the posts to the upper parts of said upright members whereby said posts move up and down corresponding to the movement of said upper parts, the supporting means secured between said posts.

* * * * *

UNITED STATES PATENT AND TRADEMARK OFFICE
CERTIFICATE OF CORRECTION

PATENT NO. : 4,050,752
DATED : September 27, 1977
INVENTOR(S) : Donald P. Dykstra It is certified that error appears in the above-identified patent and that said Letters Patent are hereby corrected as shown below:

Column 1, line 15, "requirement" should read --requirements--.
Column 1, line 67, "of" should read --to--.
Column 2, line 6, "purpose" should read --purposes--.
Column 2, line 58, "an" should read --can--.
Column 4, line 13, "of" second occurrence should read --at--.
Column 6, line 23, "the" second occurrence should read --and--.

Signed and Sealed this

*Fourteenth* Day of *February 1978*

[SEAL]

*Attest:*

RUTH C. MASON
*Attesting Officer*

LUTRELLE F. PARKER
*Acting Commissioner of Patents and Trademarks*